May 9, 1961  J. E. STEWART  2,982,999
METHOD OF MOLDING SHAFT SEALS
Filed April 18, 1955  2 Sheets-Sheet 1

May 9, 1961 J. E. STEWART 2,982,999
METHOD OF MOLDING SHAFT SEALS
Filed April 18, 1955 2 Sheets-Sheet 2

United States Patent Office 2,982,999
Patented May 9, 1961

2,982,999
METHOD OF MOLDING SHAFT SEALS

John E. Stewart, Redwood City, Calif., assignor, by mesne assignments, to Federal-Mogul-Bower Bearings, Inc., Detroit, Mich., a corporation of Michigan Filed Apr. 18, 1955, Ser. No. 502,128

3 Claims. (Cl. 18—59)

This invention relates to the art of manufacturing shaft seals and more particularly to a simplified construction and an improved mode of making the same.

It has long been common practice to mount shaft seals by forcing the rigid casing into a mounting bore of slightly smaller diameter than the case. However, the great variety of designs available today and adapted to this mode of installation are subject to numerous shortcomings and disadvantages. One of the particularly aggravating defects pertains to the difficulty experienced in starting the seal into the mounting bore during installation operations due to the slightly larger size of the case, unavoidable variations in manufacturing tolerances, negligence in properly aligning the case with the bore, and the like. One common practice is to round off the leading edge of the casing or to chamfer the entry corner of the bore. While these expedients are helpful, they are quite unsatisfactory and fail to eliminate serious and frequent damage to seals during installation when they are not precisely centered and aligned with the bore axis. Not only must the damaged seal be discarded but, of far greater seriousness, the bore may have to be re-bored for a larger diameter seal case. And, of course, the high labor costs involved in installing seals as heretofore constructed is too obvious for comment.

Another serious difficulty attending the manufacture of seals having a synthetic rubber sealing member bonded to the casing concerns the flow of elastomer over the exterior surfaces of the case during the molding operation. Such films or flashings are difficult and costly to remove.

The present invention circumvents the foregoing and other disadvantages of prior designs in a remarkably facile and entirely satisfactory manner and by a procedure which is less costly than those heretofore employed in producing the objectionable products. Not only is the rubber flashing on the outer surface of the case completely eliminated, but the expedient responsible is utilized to provide the case with a tapering leading edge for assuring speedy, accurate and damage-free assembly of the seal in its mounting bore. These end results are obtained by forcing a cupped casing into a mold cavity having a converging sidewall simultaneously with uncured prep under the usual high molding pressures. These jointly performed operations cooperate in an unexpected manner to produce the finished product as will be explained in detail below.

Accordingly, it is a primary object of this invention to provide a new and simplified shaft seal more quickly and economically than heretofore as well as one which can be installed in a mounting bore more accurately, efficiently, and in much less time.

Another object is the provision of an improved mode of making a shaft seal of the type having a metal casing and a sealing element of synthetic elastomer.

A further object is the provision of a unique mode of performing a shaping operation on the casing while bonding the sealing element in place, which shaping operation serves different but highly beneficial functions during manufacture as well as during the use of the seal in its operating environment.

Yet another object is the provision of a method of making a seal specially constructed for speedy installation and having a permanent gasket on its leading edge so positioned that portions cannot be shaved off during installation.

A further object is the provision of a seal manufacturing technique in which the seating of the casing in a mold cavity acts in conjunction with the introduction and molding of elastomer thereto to shape the casing and to control the flow of elastomer to predetermined areas only of the casing.

Numerous other objects and advantages of the invention will become apparent from the following detailed specification of a preferred manner of practising the invention taken in connection with the accompanying drawings of an illustrative embodiment, wherein.

Figure 1:
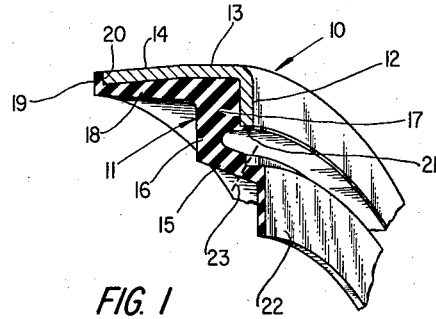
Figure 1 is a fragmentary isometric view in section of the novel shaft seal prior to the lip trimming operation.
Figure 2:
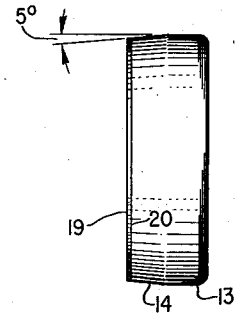
Figure 2 is a side elevational view of a completed seal.
Figure 3:
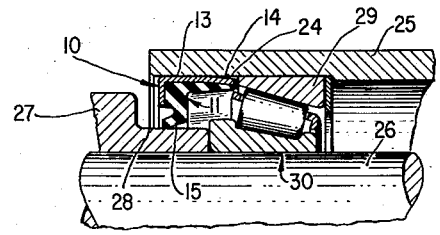
Figure 3 is a sectional view through a seal as installed in a typical mounting bore according to one mode of use.

Referring to the drawings and particularly to Figures 1, 2 and 3, it will be seen that the seal comprises but two elements, namely, a cupped metal case generally designated 10 and a sealing member of synthetic elastomer generally designated 11 bonded to the interior surfaces of ring 10. Casing 10 includes an inwardly extending radial flange 12 and an axially extending sidewall or cylindrical flange 13 terminating in a tapering leading edge portion 14. Sealing member 11 includes a thin sleeve-like sealing lip 15 of frusto-conical shape. A short flex section 16 connects this lip to the inner corner of a thick layer 17 bonded to the inner face of radial flange 12. Sealing member 11 also includes a relatively thin layer 18 bonded to the inner sidewall of flanges 13 and 14, as well as a gasket ring 19 bonded across the leading edge 20 of the case. A similar but considerably thinner layer 21 is bonded to the inner edge of radial flange 12 as an incident of the manufacturing operation and, unlike layer 19, does not act as a sealing gasket.

Figure 1 also shows a cupped-shape ring of elastomer 22 attached to the smaller diameter end of sealing lip 15. This ring represents excess stock resulting from the molding operation which must be trimmed away such as along the conical surface indicated by dotted line 23. This severing is known as the trimming operation and is done with great precision in order that the innermost edge of lip 15 will form a sharp sealing edge with a shaft or other rotating surface.

Referring to Figure 2, it will be noted that the leading end portion 14 of the seal case is swaged inwardly to provide a tapering surface making an acute angle with the cylindrical surface 13 at the trailing end of the case. A taper angle of approximately 5° has been found to give excellent results in service. However, it might be desirable to increase the taper angle slightly where the axial length of the casing flange is relatively short as compared with the proportions shown in Figures 1 to 3.

The important consideration in all instances is that the diameter at the leading edge of the seal be appreciably less than the entrance diameter of the mounting bore in which the seal is designed to be installed. When so constructed, it will be manifest that the leading edge of the seal can be pressed into the bore for a substantial distance easily and without interference. This enables the installer to register the seal with the bore opening speedily and then check the axial alignment of the seal with that of the bore before applying the rather high pressure required to fully seat the seal in the bore.

The foregoing will be more readily appreciated by reference to Figure 3 showing the seal construction just described properly installed in a typical application. Thus, the seal is shown pressed into the accurately machined mounting bore 24 of a housing 25 with its gasket 19 pressed against the end of raceway 29 of anti-friction bearing 30. This bearing supports a shaft 26 to which is secured a hub 27 having a smoothly finished surface 28 against which the resilient sealing lip 15 seats. It will, of course, be appreciated that in many seal applications, bearing 30 would be supported in some manner other than in mounting bore 24. In this event, the bore would be much shorter and gasket 19 would seat directly against the shoulder at its inner end instead of against outer raceway 29.

From Figure 3, it will be apparent that only cylindrical portion 13 of case 10 has a fluid-tight press fit with the sidewall of bore 24. The tapered forward end 14 of the case, being of slightly smaller diameter than the bore, is spaced slightly inwardly from the bore wall. Actually, this spacing is only a few thousandths of an inch, but it is quite adequate to permit speedy registry of the seal with the bore and proper assembly therewithin without damage to either the seal itself or to the costly structure within which it is installed.

Another important advantage of this tapered construction resides in the fact that the outer rim of sealing gasket 19 is also spaced inwardly from the bore wall as it is being installed therein. It follows that this thin and rather delicate gasket is held out of contact with the bore wall as the seal is being installed. Were it not for this fact, the edges of the gasket would be abraded by the sidewall of the bore with the likelihood that the resulting particles and shavings might easily drop into the interior of housing 25. These minute particles of resilient material have been found from experience to cause serious damage in delicate mechanisms, anti-friction bearings, high-precision gears and the like. Such particles are particularly serious if they find their way into the minute passageways common in certain hydraulic systems and servo systems. The consequences of these possibilities in many seal applications are so serious that gaskets flush with the mounting sidewall of the seal are considered unacceptable making it necessary to resort to other and more costly gasketing expedients.

The foregoing description of the finished product has been given in order that the novel method of making it, which follows, would be more readily understood.

Figure 4:
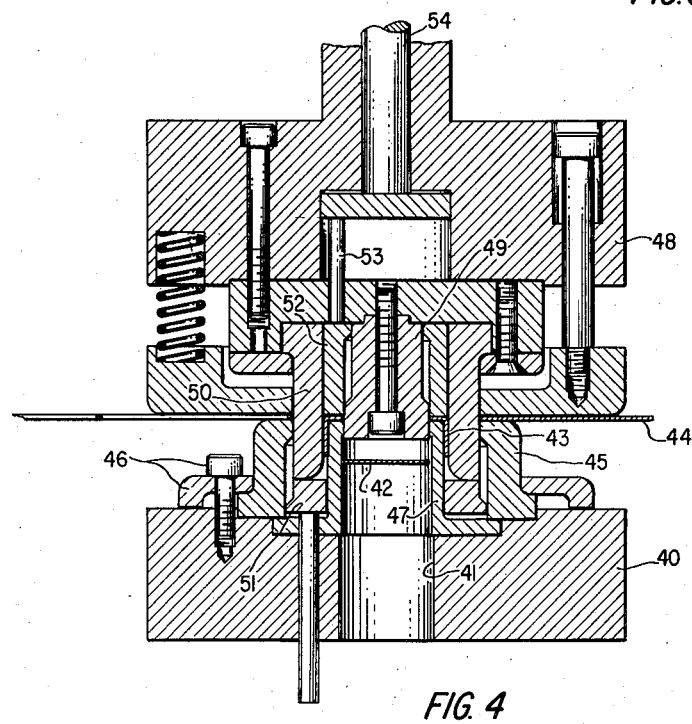
Figure 4 is a sectional view through a die employed in forming the casings from sheet stock.

The first step in making the seal is the blanking of case 10 from sheet metal preferably performed in a single operation at a rate as high as 150 units per minute from a single die of the type illustrated in Figure 4. Since this die is well-known in the art, and per se, forms no part of the present invention, only a summary description will be necessary.

The case forming die comprises a bed plate 40 having a central passage 41 through which the center slug 42 falls as it is struck from the center of a newly formed case 43. A sheet of strip stock 44 is fed into the die from the right by automatic advancing mechanism and is supported on the upper end of blanking die 45. The latter, as well as the inner forming tube 47, is rigidly secured to bed plate 40 as by clamping means 46. Reciprocatably supported above the bed plate and held in accurate alignment therewith is a rather massive punch holder 48 for rigidly supporting all those parts of the die located above the strip of stock 44. Protruding downward from the axis of the punch holder is the pierce punch 49 which pierces slug 42 from the center of case 43 as the final step of the forming operation. Concentric with punch 49 is an outer forming ring 50 which has several functions. One of these is to cooperate with blanking die 45 in cutting the rim of the case from the strip material. Thereafter, it cooperates with inner forming tube 47 and with a draw ring 51 in forming the cylindrical sidewall of the case 43 in a manner well-known in the art.

The sequence of operations is to first blank case 43 from strip 44 by means of blanking die 45 and forming ring 50. Thereafter, the inner and outer forming rings, together with the draw ring, form the cylindrical sidewall of the case. And lastly, slug 42 is pierced from the center of the case and ejected downwardly through passage 41. As the parts of the die are drawn apart to release the newly formed case, shedder 52 is actuated by knockout pins 53 and stem 54 to strip the case from outer form 50. At the same time, draw ring 51 is elevated to eject the case from the inner form tube should it adhere thereto.

From the foregoing, it will be evident that cases 43 are formed in a single cycle of the die and emerge therefrom in readiness to receive the elastomeric sealing element so essential in the completed seal. It will also be evident that the case blank, of necessity, is formed with a cylindrical sidewall as otherwise it could not be removed from the inner forming tube 47 without obliterating the taper on its free rim edge.

Figure 5:
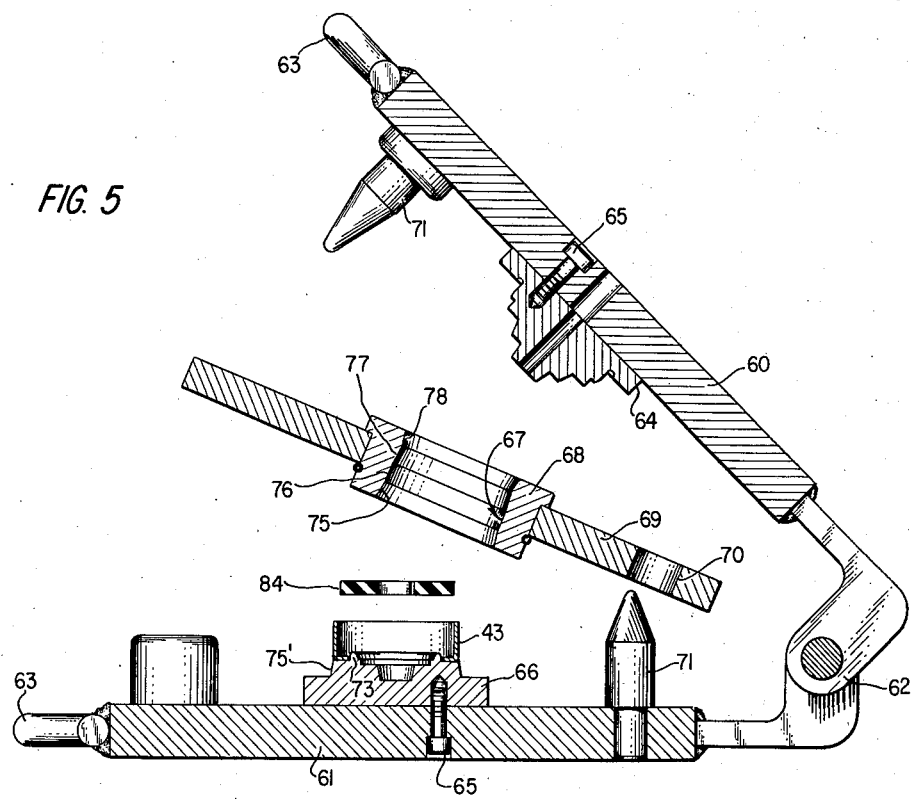
Figure 5 is a sectional view through a mold employed in swaging the casing to a predetermined shape while molding a resilient sealing element thereto, the mold parts being shown in open position in readiness for loading.
Figure 6:
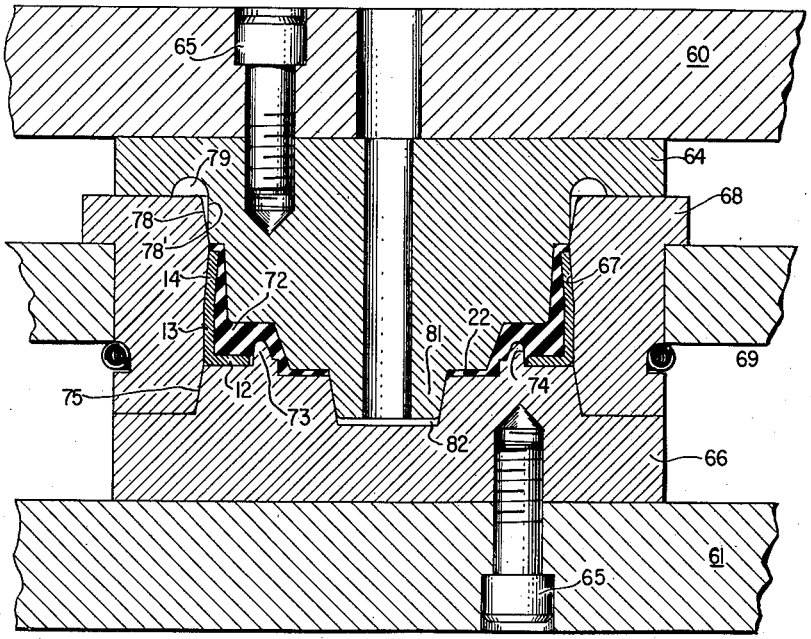
Figure 6 is a fragmentary view of the mold on an enlarged scale while the mold is closed.

Reference will now be had to Figures 5 and 6 showing the manner in which the sealing member is bonded to the case simultaneously with the swaging of the casing sidewall to provide the tapered section 14 adjacent its leading edge. Only the mold employed in this operation has been illustrated, it being understood that it is placed between the platens of any conventional hydraulic molding press in a manner well-known in the art. As here shown, the mold comprises upper and lower plates 60 and 61 preferably pivotly connected together by a hinge 62 and having handles 63 at their forward edges.

The mold core ring 64 is secured to upper plate 60 by screws 65, while lower mold ring 66 is similarly secured to the upper face of mold plate 61 in position to mate accurately with the core when the mold plates are closed. The outermost wall 67 of the mold cavity is formed by a center ring 68 mounted in a holder plate 69. The front and rear edges of holder 69 are provided with openings 70 which register with locating pins 71 anchored to the upper and lower mold plates 60 and 61.

As is true of all rubber molds, the various mold elements are very accurately machined and cooperate with one another to form a mold cavity having the desired contour of the finished product such as that indicated at 72 in Figure 6. Note that lower mold ring 66 has an upwardly projecting ring 73 having an outer sidewall 74 of slightly smaller diameter than the pierce diameter of radial flange 12 of casing 43. In addition to its function of forming the flex section 16 of the sealing lip, flange 73 and its outer wall 74 serve to accurately center casing blank 43 in the mold at the beginning of the molding operation.

Referring to the inner periphery of mold center ring 68, it will be seen to include a lower outwardly flaring wall 75 which mates accurately with a similar surface 75' on lower mold ring 66. Immediately above tapered surface 75 is a cylindrical surface 76 of a size gauged to fit snugly about the cylindrical outer surface 13 of seal case 10. Immediately above this is a tapered surface 77 of the same size and shape desired in the tapered leading edge 14 of the seal case. Surmounting surface 77 is an outwardly flaring surface 78 which cooperates with surface 78' to form a flash cavity opening into rind cavity 79.

Another important feature of the design is that the total axial height of cavity 72 is somewhat greater than the axial length of case 10. This not only accommodates variations in tolerances of the cases as they come from the blanking press, but assures an adequate thickness for gasket 19 and obviates the possibility of damage to the expensive molds.

The tapered lower end 81 of core ring 64 mates snugly in a mating depression 82 formed centrally of lower ring 66. Mating surfaces 81 and 82 at the inner periphery of the mold cavity prevent the escape of synthetic stock from this point, while the corresponding tapers at 75, 75' and 78, 78' of the center ring perform similar functions at the outer periphery of cavity 72.

The operation of the mold is as follows. While the mold is held open, as illustrated in Figure 5, a newly formed casing blank 43 having a cylindrical sidewall is inserted on lower mold ring 66 with flanged ring 73 extending upwardly through the pierce of the case. A ring of uncured elastomer 84 is then dropped into the open top of the case after which center ring 68 and its holder 69 are dropped in place over centering pins 71 on lower mold plate 61. Due to the fact that tapering section 77 of the center ring is smaller in diameter than the upper edge of case blank 43, the center ring and its holder will be initially supported by blank 43 at a level somewhat above the fully closed position of the mold. The next step is to lower upper section 60 of the mold and apply pressure to the platens of the molding press, not shown. As the press starts to close in the mold, cavity 72 is appreciably larger than it will be when the mold is fully closed and there will be ample space for the ring of elastomer 84. As pressure is applied to close the mold, it will be obvious that tapered surface 77 of the center ring swages the sidewall of the case inwardly with the outer leading corner of the case pressed very firmly into engagement with the case-hardened surface 77 of the center ring.

As the mold approaches its fully-closed position, stock ring 84 will be placed under high pressure causing it to flow into all parts of the cavity under very considerable pressure. Were it not for this pressure build-up on the inner sides of the casing blank, its sidewall would tend to taper inwardly from its junction with radial flange 12. This, of course, creates an annular void of triangular cross-section inwardly of surfaces 76 and 77 of center ring 68. However, the formation of this void is thwarted by the high pressures acting on the elastomeric material which cause the sidewall of the case to conform exactly with the surfaces 76 and 77 of the center ring.

Normally, a slight amount of excess prep is used in forming ring 84 to insure complete and uniform filling of the cavity. The excess material flows into rind ring 79 at the top of the mold while other excess portions form hat portion 22 at the inner rim of the molding. None of the rubber stock flows past the outer corner at the free or leading edge of the case and along the outer surface of the case as it unavoidably does when using prior molding techniques. The reason for this is that the corner of the case is pressed so tightly against tapered surface 77 of the center ring that no stock can flow therepast. Instead, the surplus stock flows upwardly between surface 78, 78' and into cavity 79. Likewise, no stock flows past the inner rim of radial flange 12 due to the high pressures acting on the upper side of this flange and holding it firmly seated against the opposed surface of lower mold ring 66.

As soon as the stock has cured under heat and pressure supplied in the customary manner, the press and mold are opened and the holder for center ring 69 is lifted away carrying with it the substantially finished seal. A slight downward tap on the seal dislodges it from the center ring. After the mold parts have been cleared of any foreign matter or particles of rubber flashing, it is reloaded with a new blank and a fresh ring of prep and closed in the same manner described above to form another seal.

The newly formed seal taken from the mold is ready for installation as soon as it has been placed in a trimming lathe of conventional design and trimmed to the proper size along the dotted line 23 indicated in Figure 1 to remove the hat or flashing ring 22. Contrary to previous practice, it is unnecessary to perform any finishing operation on the case itself to remove thin layers of flashing emanating from either the inner or outer peripheries of the case for reasons explained in detail above.

While only a single embodiment of the invention has been specifically disclosed hereinabove, it will be manifest to those skilled in this art that numerous variations in the structure and mode of making the same may be adopted without departure from the principles of the invention. For example, only one style of sealing lip has been disclosed, but those familiar with this art will readily realize that lips of various shapes and contours, either with or without spring means for holding them resiliently against a rotating surface, may be employed and molded integrally with the main body of elastomer. It will also be quite apparent that the relative widths of the tapered and cylindrical portions of the casing sidewall may be varied over wide ranges to fit the needs and limitations of different operating environments. In fact, it is not essential that the casing have a cylindrical section of any appreciable width beyond that necessary to anchor the case in the housing bore. In such situations, the sidewall may be tapered substantially throughout its width, reliance being had on a narrow cylindrical band at the trailing edge of the case or even on separate clamping means for holding the case assembled in its operating position. Accordingly, it will be understood that I do not wish to be limited except by the scope of the annexed claims.

I claim:

1. The art of manufacturing oil tight rotary shaft sealing rings of the type having a resilient annular frusto-conical sealing lip secured within an annular cupped metal case so as to make a fluid-tight press fit in a shouldered mounting bore; the improvement comprising centering and seating the cupped flanged end of said case around an upstanding mold base ring, placing a body of uncured elastomeric material on said ring within said case, freely supporting a hollow inwardly tapering annular wall die upon the opposite free end of said case then inserting a shaped molding die through said hollow die and within said cylindrical metal case against the body of elastomeric material therein, applying die closing pressure to said shaped molding die and moving same into engagement with said mold base centrally of said case, said shaped molding die also engaging said hollow die exteriorly of said case to move same axially thereover and swage the annular wall thereof inwardly against the simultaneously expanding pressure of the elastomeric material within the case, whereby to prevent buckling thereof, applying heat to said elastomeric material to cure same to said case and finally separating said molding die and hollow die and removing the finished tapered sealing ring.

2. The art of manufacturing oil tight rotary shaft sealing rings of the type having a resilient annular frusto-conical sealing lip secured within an annular metal case so as to make a fluid-tight press fit in a shouldered mounting bore; the improvement comprising centering and seating the cupped case with its radial bottom flange on a mold base, placing a body of uncured elastomeric material on said base within said case, placing a hollow inwardly tapered wall die around the top rim portion of said cylindrical metal case and freely supporting same thereon, then inserting a shaped molding die through said hollow die and within said cylindrical metal case against the body of elastomeric material therein, applying die closing pressure to said molding die to cause same to forcibly engage said hollow die outwardly of said case and to move same thereover to swage the side wall of said case inwardly against the then expanding pressure of the elastomeric material within said case, arresting motion of said molding die short of contact with the top rim edge of said case for the flow of elastomeric material therebetween, applying heat to said elastomeric material to cure same to said case, thereafter opening said molding die and lifting the hollow die and removing the finished sealing ring with a tapered annular case from the hollow die.

3. The art of manufacturing oil tight rotary shaft sealing rings of the type having a resilient annular frusto-conical sealing lip secured within an annular cupped metal case so as to make a fluid-tight press fit in a shouldered mounting bore, the improvement comprising centering and seating the cupped case with its radial bottom flange on a mold base having an upstanding annular ring, placing a body of uncured elastomeric material in said case and upon the ring of said base, placing a hollow inwardly tapered wall die around the top rim portion of said cylindrical metal case and freely supporting same thereon, then inserting a shaped molding die through said hollow die and within said cylindrical metal case against the body of elastomeric material therein, applying die closing pressure to said molding die to cause same to forcibly engage said hollow die outwardly of said case and to move same thereon to swage the side wall of said case inwardly against the then expanding pressure of the elastomeric material within said case, arresting motion of said molding die short of contact with the outer rim of said case for the flow of elastomeric material therebetween, simultaneously applying opposing axial pressure from said upstanding mold base ring against the elastomeric material inwardly of the radial bottom flange of said cupped metal case to form and dispose said annular sealing lip axially inwardly of said flange, applying heat to said elastomeric material to cure same to said case, thereafter opening said molding die, lifting the hollow die and removing the finished sealing ring from the hollow die.

References Cited in the file of this patent
UNITED STATES PATENTS

| | | |
|---|---|---|
| 2,158,044 | Haller | May 9, 1939 |
| 2,393,751 | Chott | Jan. 29, 1946 |
| 2,454,036 | Clayton-Wright | Nov. 16, 1948 |
| 2,651,534 | Kosatka | Sept. 8, 1953 |
| 2,700,186 | Stover | Jan. 25, 1955 |
| 2,772,012 | Crabtree | Nov. 27, 1956 |